United States Patent [19]

Weinwurm

[11] Patent Number: 5,087,375
[45] Date of Patent: Feb. 11, 1992

[54] METHOD FOR PRODUCING INSOLUBLE INDUSTRIAL RAW MATERIAL FROM WASTE

[75] Inventor: Peter Weinwurm, Mississauga, Canada

[73] Assignee: Aggio Recovery, Weston, Canada

[21] Appl. No.: 299,979

[22] Filed: Jan. 23, 1989

Related U.S. Application Data

[63] Continuation-in-part of Ser. No. 110,838, Oct. 21, 1987, abandoned.

[51] Int. Cl.$^5$ .......................... B01D 15/00; C02F 1/28
[52] U.S. Cl. .................................... 210/688; 210/667; 210/751; 264/66
[58] Field of Search ................ 264/63, 29.1, 29.3, 264/29.5, 43, 44, 56, 63, 67, 66, 141; 106/407, 85, 115; 164/5; 110/221, 222, 223, 224, 237, 238, 346; 501/155; 252/629; 210/688, 667, 751

[56] References Cited

U.S. PATENT DOCUMENTS 4,872,993 10/1989 Harrison .............................. 210/666
4,882,067 11/1989 Johnson et al. ..................... 210/688

FOREIGN PATENT DOCUMENTS 8802284 4/1988 PCT Int'l Appl. .

Primary Examiner—James Lowe
Assistant Examiner—Christopher A. Fiorilla

[57] ABSTRACT

A method for handling, treating, heating and incinerating, on-site, liquid waste, sewage, sludge, cakes or solid waste. The primary treatment process utilizes a 0.1–50% power of plastic clay and may include separation, absorption, precipitation, neutralization, sedimentation, flocculation, coagulation, filtration or dewatering. The residue remaining after the primary treatment is mixed with additional clay or silicates and a suitable absorbent for either organic or inorganic, liquid material, to form a solid mixture of approximately 5–50% clay or silicates and 0.1–10% absorbent. The solidified mixture is formed into granules or other shapes having large surface area. The stable, solid granules are transferred to a conveyorized oven, dried and pyrolized or fired. Resulting organic gases may be condensed to oil or exhaust gases may be vented into a secondary incineration unit. The resulting product is composed of stable granules, detoxified of organic waste and with all inorganic waste converted into silicate form.

21 Claims, 4 Drawing Sheets

METHOD FOR PRODUCING INSOLUBLE INDUSTRIAL RAW MATERIAL FROM WASTE

This application is a continuation-in-part of Ser. No. 110,838 filed Oct. 21, 1987.

The invention relates to industrial raw materials which can be produced from waste.

Nowadays industrial raw materials are becoming more and more expensive to produce because of the increasing shortage of the natural material sources. On the other hand, the amount of waste is increasing and raises environmental problems with regard to its destruction. Disposal of waste materials is a problem of growing complexity confronting municipalities and other treatment plant operators, particularly in view of the adoption everywhere of stricter environmental standards. The most recently used treatment systems and technology are based on the principle of incineration, chemical and physical treatment and solidification. The results of such prior art treatment is a residue which is typically used as land fill. Leaching of waste is a continuing problem. The treatment of waste material is very often extremely difficult, complex and expensive. Equipment suitable for accommodating different types of waste from a variety of sources is more complicated and hence more expensive. The residue and emissions from waste treatment processes in use today are of concern because of the hazards they pose. Furthermore, the use of toxic waste residue for the purpose of land filling has its limitations. Current technology also requires transportation of huge volumes of waste materials from the source of the waste to the treatment facility. This of course poses a safety and health hazard. The threat of spillage of toxic material during transportation or leaching from the final disposal site persists.

Prior art references disclose attempts to utilize waste material in the production of useful materials such as construction bricks (Bayer et al. U.S. Pat. Nos. 3,886,244 and 3,886,245). Webster et al. in U.S. Pat. No. 4,028,130 propose the incorporation of digested sewage sludge into a matrix of alumino—siliceous material, such as fly ash, to produce landfill or structural base materials. Lingl in U.S. Pat. No. 4,112,033 discloses a method for treating and handling industrial sludges without human contact to form ceramic articles. Lingl, mixes industrial sludge with clay in a mixer and then stores the material to assist the subsequent extrusion process. After extrusion the material is dried and fired in a conventional kiln to produce bricks. The exhaust gases are vented into the kiln. Lindl teaches using any clay to make bricks rather than using specific clay to stabilize the waste and to produce insoluble, non-leachable product. In particular, Lindl does not teach use of clay for primary treatment of waste. Furthermore, Lindl does not discriminate as to type of clay used and accordingly has not appreciated characteristics of different types of clay which assist to stabilize waste. The process of Lindl is limited to treating material with a waste content of 30-50% and a moisture content of less than 50%. Lindl's process is also limited to the types of waste stated therein. Furthermore, Lindl utilizes a large existing brick producing facility to treat waste and accordingly has problems resulting from lack of specificity. Using a modified system results in problems such as automation and accommodating source and volume of the waste. Although Lindl states the industrial sludges are treated without human contact, it is apparent that workers must still be on the premises with consequential exposure to organic material evaporating out of the waste. Lindl does not substantiate his claims regarding the quality of his final product in view of existing government standards regarding leachability of products.

For the above reasons, there is a need for the inexpensive production of industrial raw material from waste material by methods which are effective with regard to economy and environmental protection.

The present invention provides for the production of material by the treating and handling of waste using a method which is flexible, efficient, economical and safe.

The present invention also provides an industrial raw material producible from waste which can be used for a variety of applications. In one aspect, the present invention is an inorganic, insoluble industrial raw material, based on processed waste, which is characterized by a particle size of 0.2-15 cm, whereby 0.3-8 cm are preferred. Depending on the use of the above material a particle size of 0.4-2.5 cm, especially 0.5-1.5 cm, might also be favorable. The bulk density of the above material in general lies in the range of 400-1000 kg/m$^3$ and the specific gravity results in 600-1300 kg/m$^3$. The material exhibits a pH value of 6.0-10.5, preferably a hydrophilic surface and an absorption of moisture in the range of 0.5-14 wt. %. The metal content is 0.5-60 wt. %, preferably 10-45 wt. %, and particularly preferred is 25-38 wt. %. The temperature resistance ranges up to 1150° C. The product has a brown to grey color and is odorless. The material is furthermore characterized by very reduced or no leachability of harmful metals, especially with regard to heavy metals under atmospheric environmental conditions, especially at a temperature of 20° C.-50° C. and under the influence of air and water. In one preferred embodiment the raw material comprises subgroup metals whereby at least one metal is selected from the group consisting of Fe, Zn, Cr, Ni, Ba, Be, Pb, Cd, Ti, Co and Cu or combinations thereof. Preferably the material has a content of at least one of, the aforementioned subgroup metals in the range of 0.5-60 wt. %, most preferably 10-45 wt. %.

The present invention is also a method for treating a variety of different types of hazardous or toxic waste comprising the steps of:
a) mixing the waste materials with a plastic material (also called a reagent) capable of forming non-leachable compounds with metals by reaction to form a plastic mixture;
b) forming shaped articles with large surface areas; and
c) heat-treating the shaped articles to remove the organic matter and to bond the inorganic matter in stable, solid and insoluble silicate complexes.

In another aspect, the above inorganic, insoluble industrial raw material can be produced by a method for treating a variety of different types of hazardous or toxic waste characterized by:
a) mixing the waste materials, with a plastic material comprising oxides of silicon and aluminum and capable of forming non-leachable compounds with metals by reaction to form a plastic mixture;
b) preparing or forming the mixture into shaped articles with a large surface; and
c) heat-treating (calcining and sintering) the shaped articles to remove the organic matter and to bond the inorganic matter in stable, solid and insoluble silicate complexes.

In yet another aspect, the present invention comprises a method for treating a variety of different types of hazardous or toxic waste comprising the steps of:
a) mixing the waste with 5–50% powdered plastic reagent and 0.1–10% of an absorbent to form a cohesive mixture wherein said waste is physically and chemically bound to said plastic reagent;
b) extruding the solid mixture to form granules having a large surface area;
c) heating the granules; and
d) sintering and calcining said granules within the temperature range of 750°–1150° C.

The preferred waste to be used comprises organic and inorganic, industrial and hazardous, liquid and solid waste materials. Such waste materials include for example electroplating sludge, $Na_2Cr_2O_7$ solution, paint sludges, heavy metal sludges, miscellaneous sludges comprising heavy metals and oil, leather sludges with $Cr^{+6}$, paper (caustic) sludges, fly ash, bottom ash and so on.

In a preferred embodiment of the present invention the waste is subjected to a primary treatment before step (a) of any of the methods comprising adding the plastic material (reagent) and separating, neutralizing, precipitating, coagulating, sedimenting, filtering, dewatering, absorbing or flocculating the waste in dependence upon its characteristics to form a residue. Depending on the state of the waste material, the primary treatment process may not be necessary and can be bypassed. The choice of treatment depends on the type of waste and efficiency of technology, and will be obvious to those skilled in the art. The following are some examples:

(a) Neutralization would be used to raise the pH value of acidic waste;
(b) precipitation would be used to isolate heavy metal hydroxides (for example $Cu(OH)_2$, $Cr(OH)_3$, $Zn(OH)_2$, $Ca(OH)_2$);
(c) coagulation and flocculation would be used to coagulate and flocculate particulate matter in waste solution (e.g. leather sludge);
(d) sedimentation is used when the plastic material combined with waste material results in the latter settling so that the liquid portion may be removed; and
(e) filtration via filter press is used to squeeze the water out of the plastic material/waste mixture.

Absorbents are added if the plastic material (depending on the waste) does not exhibit a sufficient absorptivity by itself.

The amount of the plastic material and the absorbent (if necessary) of the present production method depends on the properties, consistency and composition of the waste material that is mixed together. It is also dependent upon the properties of plastic materials and the absorbents themselves. For many applications, the ranges are 5–50 wt. % plastic material, 0.1–10 wt. % absorbent and from 50 to 94.9% waste material. In other applications, the constituents may be mixed together in other proportions so long as the mixture produced is shapable with conventional shaping equipment in a manner suitable to form shapes which have a form and dimensional stability for the production of the finished article.

The forming in step (b) of each method of shaped articles like granules or other large surface area shapes may be performed by any conventional shaping means. For example, granules may be formed by extruding the material and then cutting it into pieces. The big advantage of granules is the increased surface area provided which facilitates the treating and handling of the waste. Granules also reduce the stickiness of the original waste during thermal preparation. After extrusion and forming, the granules are stable enough to be transported without the risk currently present in transporting waste material. Further possibilities of forming shapes with a large surface are by drying in a fluidized bed dryer or pressing.

The amount of plastic material used in the primary treatment system depends on the relative properties of the plastic material, the waste material and the treatment technology. It generally lies in the range of 0.1–50 wt. % with regard to the waste material.

The present invention also provides a secondary treatment system (commencing with step (a) of each method) which permits the fixing of the waste material to the plastic material and the maintaining of shape stability of the mixture, which is very important for thermal treatment. At the thermal preparation step of each method a very strong connection (chemical-physical bonding) is created between the plastic material and the inorganic parts of the waste material to form a stable, artificial material useful as industrial raw material for a variety of applications.

A suitable plastic material for the present invention should have the following properties in powder form:
good absorption
high plasticity, capability to form granules
capability of being sintered
ability to form non-soluble complex with inorganic waste material.

The plastic material of the present invention includes alkaline metals, earth alkaline metals, boron, iron, silicon or aluminum. More specifically, the plastic material must include one or more of the following, oxides:
$SiO_2$
$Al_2O_3$
$B_2O_3$
$Fe_2O_3$, $FeO$
$Na_2O$
$CaO$
$K_2O$
$MgO$ It should be understood that references herein to "clay" are meant to include the aforesaid oxides.

The above plastic material facilitate the primary treatment and liquid absorption, silicatization and reaction of the waste to convert the waste to a stable solid complex of insoluble material.

Suitable silicate and additive minerals are as follows: albite, calcite, bauxite, borax, dolomite, felspar potash, flint, kaolinite, kyanite, magnesite, mica, montmorillonite, nepheline, orthoclase, sillimanite, spodumene, talc, vermiculite, wollastonite, aluminum oxide, silica oxide, lead bisilicate, diatomaceous earth, zeolyte and Na/Ca borosilicate glass.

The plastic material used in the present invention may preferably comprise 40–50 wt. % of a mineralogical composition including the three-layer minerals illite, vermiculite, montmorillonite and chlorite.

A preferred plastic material of the present invention comprises clay and/or aluminosilicates with an average particle size of less than 5 μm. Clay has a long history of industrial use and as a chemical reagent it is safe to handle. Clay may be used in the primary treatment system to improve coagulation, flocculation, sedimentation, absorption, neutralization and dewatering, and also to fix the waste material to the clay. An especially preferred plastic material includes shale. The chemical composition of the shale used may be as follows: $SiO_2$ 58.26%, $Al_2O_3$ 18.82%, $Fe_2O_3$ 6.96%, $MgO$ 2.9%, $CaO$ 6.56%, $NaO$ 0.33%, $K_2O$ 4.87%, $TiO_2$ 0.98%, $MnO_2$ 0.13%, $B_2O_3$ 0.19%. Shale is clay previously sedimented, which has been subjected to pressure. Shale can be crushed and blended to produce excellent plastic materials. Such material is capable of strongly fixing trace material in its body.

In the method of the present invention it is preferred to use a plastic material with a high concentration of particles less than 1 $\mu$m in size. The processes of coagulation, precipitation, flocculation, sedimentation and dewatering are assisted by the use of very fine powder, especially less than 0.5 $\mu$m.

For neutralization of acidic waste it is preferred to use a plastic material with soluble salt concentration (Mg, Ca, Na, K) as a substitute for hydroxides. The soluble salt concentration may be in the range of 2000 ppm.

To improve the absorption of the plastic material it may be mixed with an absorbent which can absorb more water than the plastic material alone. The use of an absorbent therefore may reduce the necessary amount of the plastic material. For example clay can absorb 25% liquid whereas clay plus an absorbent can absorb up to 20 times its weight in liquid. Preferred examples of absorbents are Na-Ca borosilicate expanded glass, expanded clay and/or expanded silicate. Further possible absorbents are acrylamide copolymers. The most preferred absorbents are Na-Ca borosilicate expanded glass (0.1-10%) and perlite because they also contain silicate, which helps to form complexes (i.e. which help to physically and chemically bond the waste material to the plastic material), and fluxes (Na-Ca) which assist in the production of granules having the desired characteristics. A preferred combination of a plastic material and an absorbent may comprise 40 wt. % clay and 3 wt. % of one of the above absorbents with regard to the total mixture of the waste material. The components may be fed to a mixer automatically by conventional conveyance systems. The mixture must be plastic enough to offer good shaping and granulation properties.

After shaping the mixture to shaped articles with a large surface in step (b) of each method of the present invention, the articles are heat-treated to remove organic matter and to bond the inorganic matter in stable, solid and insoluble silicate complexes. To effect the heat treatment, the material may be fed into a conveyorized dryer, oven or kiln, and the shaped articles are dried, heated, distilled, pyrolyzed, sintered or calcinated. The particular manner in which this is done will depend on the source of the waste mixture, the properties of the inorganic or organic materials and the desired process steps. Conveyorized ovens and kilns provide the flexibility to economically build a small or large waste treatment unit at the waste site thereby circumventing the necessity of transporting waste material. Conveyorized ovens and kilns may also may also be mobile. The capacity range of conveyorized ovens and kilns may be less than 1 ton per day to more than 100 tons per day. The process of the present invention further provides working conditions which are readily adjustable. A wide range of temperatures is available (60°-1300° C.) depending on the chosen process. Using a conveyorized system minimizes the level of harmful substances in the system environment. During the thermal treatment the inorganic components of the waste material are transformed into compounds bound to silicates which are produced from the plastic material and made harmless.

In the case of organic material included in waste products, the shaped articles are first dried or distilled and thereafter heated in an oxygen-free environment (pyrolysis). During the drying step which preferably occurs in the temperature range of 60°-200° C. organic solvents and water may be distilled and reclaimed. After drying the shaped articles are preferably pyrolyzed at a temperature of 450°-500° C. for a period of about 30 minutes. The resulting organic gases may be condensed to organic liquids (oils).

In a preferred embodiment of the inventive method for producing the inorganic, insoluble industrial raw material the shaped articles are calcinated and sintered (after drying, distilling and pyrolyzing which are optional). The calcining sintering step is preferably performed at a temperature between 750° and 1150° C., with 800° to 1050° C. being particularly preferred. The calcinating time may lie within the range of 3 minutes to 2 hours and preferably lies in the range of 3 to 20 minutes, with 10 minutes being most preferred.

The exhaust gases produced by heat treating may be incinerated in an incineration unit. If the exhaust air requires a cleaning system (air pollution control system), it may be passed through scrubbers and finally filtered through a pollution filter system.

In the process of the present invention the surplus heat is preferably recycled using conventional waste heat recovery methods such as a heat exchanger.

The method of the present invention is preferably performed in an automatic, closed conveyorized system which is indirectly heated. By using an indirectly heated system the present invention permits reducing the volume of exhaust air and dust. In a closed system no human contact or presence is necessary in performing the method of the present invention, and since all materials are contained within the closed system until the final articles are produced, there is no health hazard.

During thermal preparation of the mixture of the waste and the plastic material (sintering, silicatization, vitrification and melting reaction), the solid inorganic waste material and silicates are converted to form a stable solid complex of insoluble material with physical-chemical bonds, which is safe to use as an industrial raw material. Leaching tests, particularized later herein, confirm the high stability of the final product produced using the present invention.

Furthermore, the inorganic, insoluble industrial raw material may be used as fillers. These fillers can advantageously be used for paint and coatings, sealants, asphalt or rubber, fire protection systems, boat construction and repair and so on.

A further use for the above industrial raw material can be seen as controlled size aggregates for gypsum wall-board, roofing systems, castable and/or gunning refractories, lightweight pre-fab concrete units, lightweight structural concrete, low density oil well cements, drilling mats and so on.

The industrial raw material of the present invention can also be used as an additive for abrasives, as catalyst support, or vacuum mold fabrication and energy management auto body structures.

The following is description by way of example of certain embodiments to illustrate the present invention, reference being made to the accompanying drawings in which.

Figure 1:
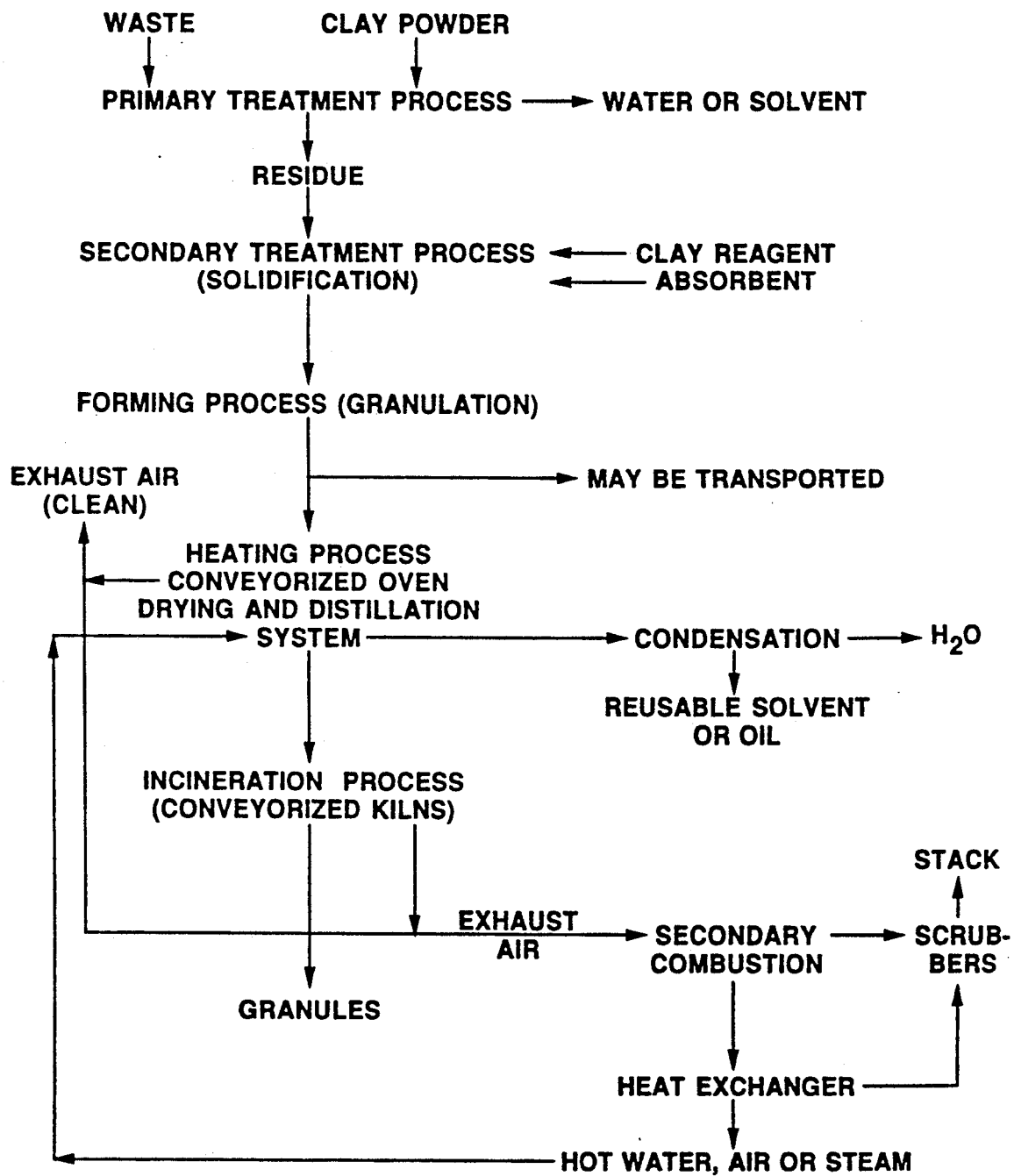
FIG. 1 is a flow chart-block diagram of one embodiment of the present invention.

FIG. 1 diagrammatically shows a system for practicing a preferred embodiment according to the teaching of the present invention. Waste material and clay powder are mixed in the primary treatment process. FIG. 1 shows water or organic solvent (liquid-solid separation) flowing out of the primary treatment system. The residue of the primary treatment system is mixed with suitable clay material and absorbent material and solidified. The solidified material is shaped to form granules or other shapes with a large surface area which are thermally prepared by heating, distilling and pyrolysis or calcination and sintering. If necessary, the exhaust air is incinerated in an incinerator and cleaned in a pollution control system. Solvent, water or oil may be condensed and recycled.

Figure 2:
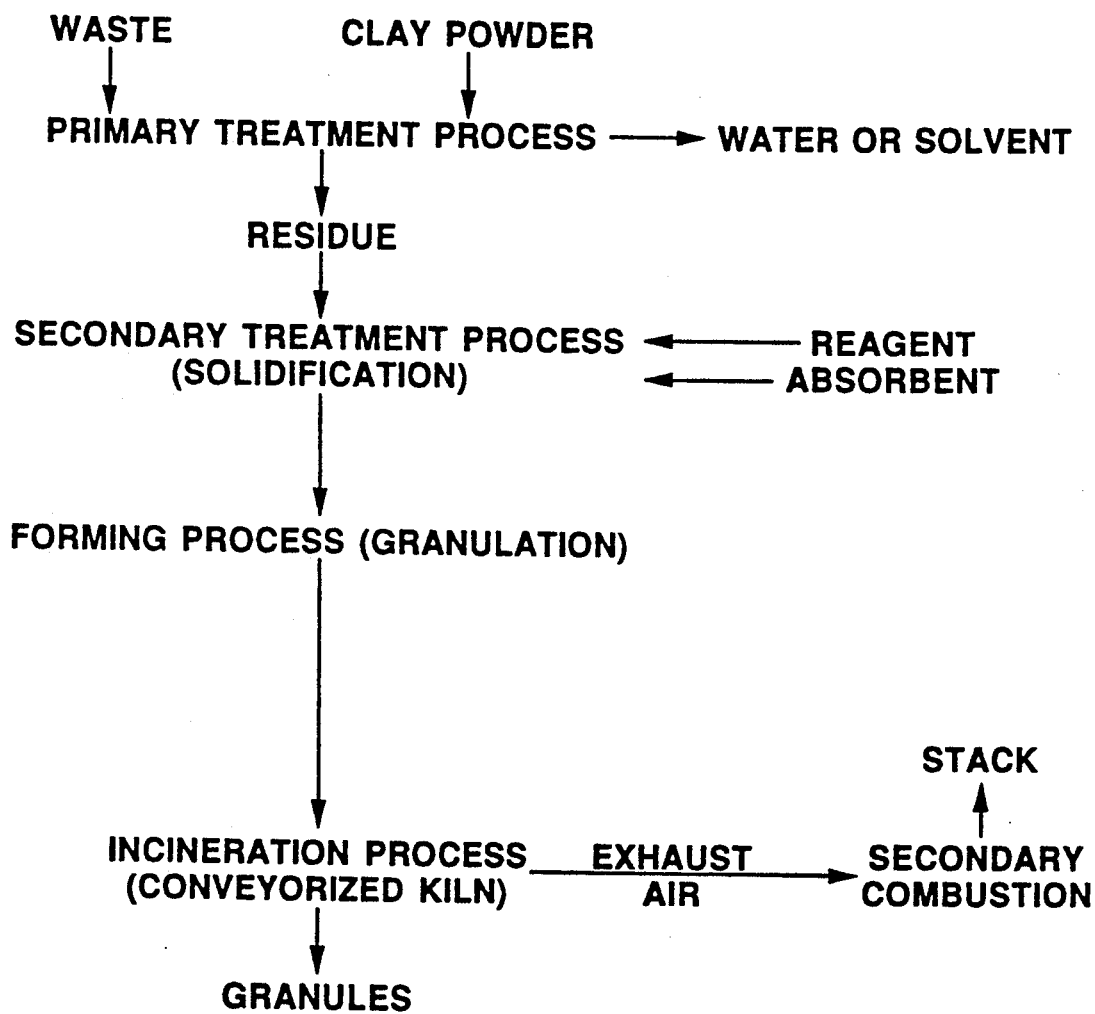
FIG. 2 is a flow chart-block diagram of another embodiment of the present invention.

FIG. 2 shows, diagrammatically, a similar process to that of FIG. 1, without condensation and distillation means and without an air pollution cleaning system. This particular system is suitable for mixed organic and inorganic waste which does not contain any suitable organic material for recycling by condensation and distillation. The exhaust air, after incineration, is without means to clean it.

Figure 3:
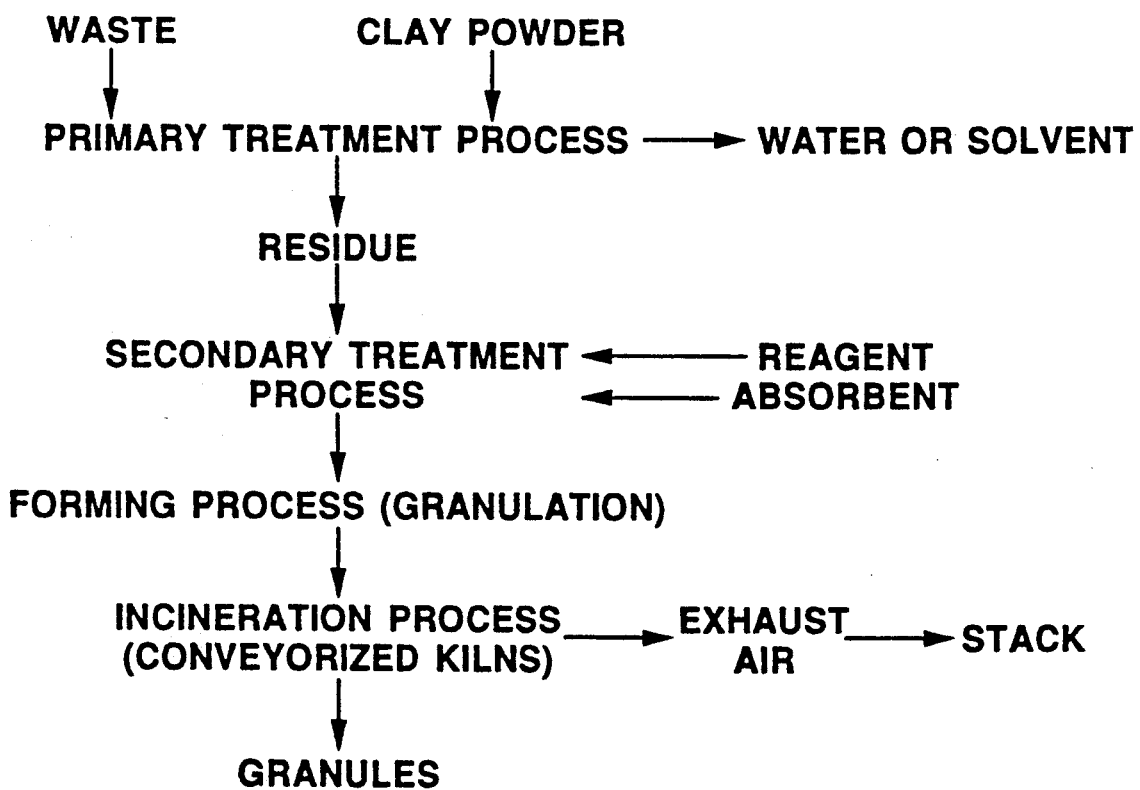
FIG. 3 is a flow chart-block diagram of yet another embodiment of the present invention.

FIG. 3 diagrammatically shows a process similar to that of FIG. 2 without a secondary combustion system. This particular process is suitable for inorganic liquid or solid waste with a small amount of harmless organic waste.

Figure 4:
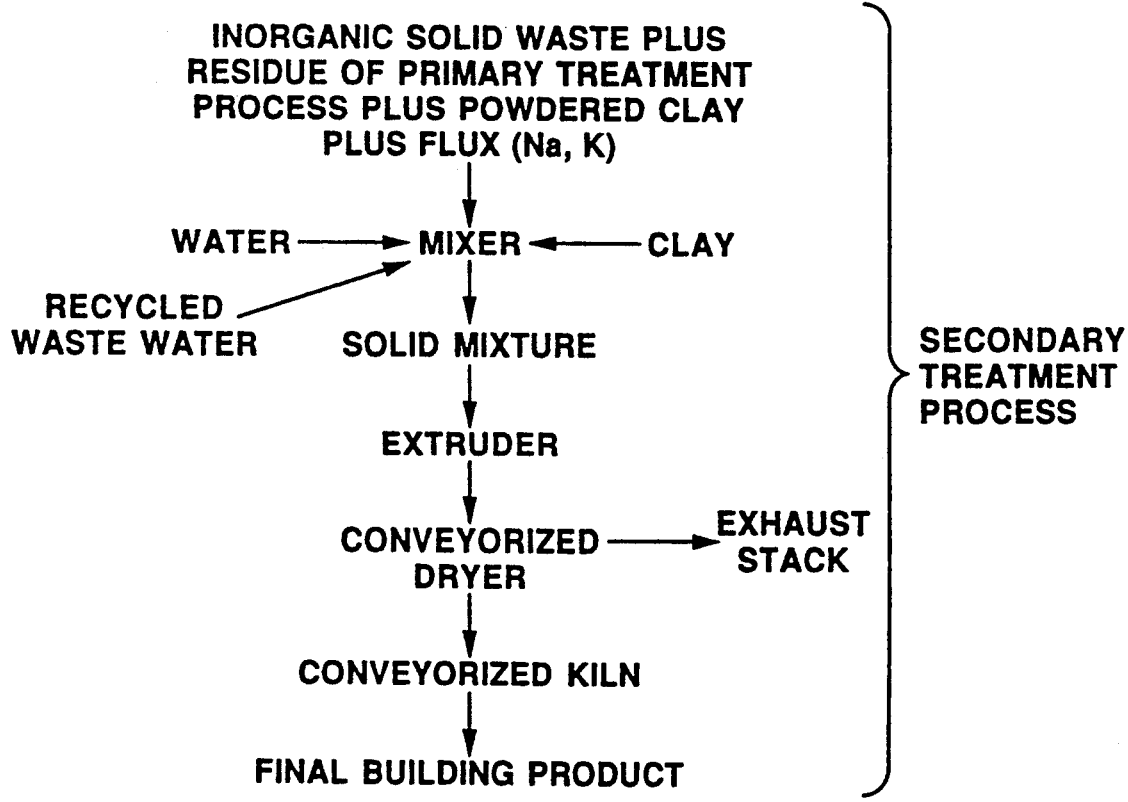
FIG. 4 is a flow chart-block diagram of yet another embodiment of the present invention.

FIG. 4 shows, diagrammatically, a system similar to that of FIG. 3, without the primary treatment process. This particular process is suitable for solid inorganic waste with a solid content greater than 70%. The solid inorganic waste may be crushed and pulverized if necessary. This would include for example hazardous residue from incinerators. The flux is used when necessary to reduce the melting temperature of inorganic metals. An inorganic absorbent can also act as a flux.

The present invention can be used with a wide variety of industrial and hazardous toxic wastes. For example, heavy metals are found in inorganic solutions and miscellaneous waste materials. Cyanide is found in metal plating liquid waste. Dirty oils are found in solid organic or inorganic waste. PCB is found in oil waste. The present invention can also be used to make low level radioactive waste, non-leachable.

EXAMPLE 1

Oil Sludge and Heavy Metals

The on-site method of treating, handling, heating, sintering and calcining waste water and sludge generated from recycling metals from car destruction facilities having a high content of Cu and Pb was achieved according to the teachings of the present invention. The waste water was treated to prepare it for the primary treatment process. The waste water containing organic waste was mixed with 5% powdered plastic clay to improve coagulation, flocculation, sedimentation and homogeneity of the waste during primary treatment. The organic sludge generated from the sedimentation process consisted of 31% organic material (oil), 28% $H_2O$ solution with NaOH (weak) and 51% solid parts (clay, metals and heavy metals). Organic sludge was mixed with plastic clay (shale) powder during primary treatment which included 1% inorganic absorbent (Na/Ca borosilicate expanded glass), weight ratio 2:1 (sludge:clay). This mixture was then shaped to form granules. The stable solid granules were transferred to a conveyorized electric oven where they were heated and dried for 35 minutes at a temperature of 100°-120° C. to 96% solid. After drying, the material was conveyed to be heated at 460° C. in an oxygen-free environment for 25 minutes (pyrolysis). This produced gases which were condensed to oil. The remaining solid was calcinated and sintered in a conveyorized electrically heated kiln for 12 minutes at 1050° C. and this produced inert granules with a particle size of 7 mm, a density of 630 $kg/m^3$, a specific gravity of 800 $kg/m^3$, a pH value of 7.3 and a temperature resistance up to 1050° C. The material produced can be used in the building industry as raw material or an filler. The exhausted air was combusted in an incinerator and the surplus energy was used for producing hot water via the heat exchanger.

EXAMPLE 2

Sludge from Leather Treatment

The method of treating, handling and calcinating of solid and liquid waste generated from leather tanning was performed on-site of the waste production according to the teachings of the present invention. Waste water from leather preparation was mixed (before primary treatment) with 1-2% clay powder (shale) to improve sedimentation. The sedimented sludge which consisted of 98% $H_2O$ and 2% solid was fixed with acrylamide copolymer flocculant and centrifuged. Clay powder improved the filtration, flocculation, coagulation and centrifugation. This generated sludge, consisting of 17% organic material (fat, leather, oil), 9% solid (clay, Ca, Na, Cr) and 74% $H_2O$. The sludge was then mixed with a plastic material, namely clay powder shale plus 2% inorganic absorbent consisting of Na/Ca borosilicate expanded glass with a ratio 1:1 (sludge:plastic material). This preparation was then mixed with dry leather shavings (leather with Cr). The leather shavings improved solidification of the mixture and were used in the ratio 1:1 (leather:mixture). This mixture was then shaped to form granules with a particle size of 4 mm. The stable solid granules were transferred to a conveyorized calcinator which was electrically heated for 10 minutes at a temperature of 1070° C. This produced inert granules with a bulk density of 400 $kg/m^3$, a specific gravity of 650 $kg/m^3$ and a pH value of 6.7. The granules were safe to use as raw material in the building industry or as filler. The exhausted air was combusted in an incinerator and the waste energy was used for producing hot water using a heat exchanger.

EXAMPLE 3

Paint Sludge

The method of treating, handling, heating and calcinating of paint sludge, on-site, was performed according to the teachings of the present invention. The paint sludge generated from distillation of solvent (dry distillation) and consisting of 15% solvent and 85% solid (non-metallic elements, for example S, P, metallic elements, for example Co, Mn, Pb, Zn, Cr, Ti, and organic constituents, for example polymers, alcohols, ketones, esters) was mixed with plastic clay (shale) powder which included 2% inorganic absorber (Na/Ca borosilicate expanded glass) in a weight ratio of 3:2 (sludge:-clay). This mixture was then shaped to form granules of 10 mm size. The stable solid granules were transferred to an electrically heated vacuum reactor and solvent material was distilled therefrom for 25 minutes at 150°-200° C. and condensed. The remaining solid was calcinated and sintered in a conveyorized electrical calcinator for 10 minutes at 1010° C. which produced inert granules with a bulk density of 400 kg/m$^3$, a specific gravity of 730 kg/m$^3$ and a pH value of 7.1. The material was safe to use for the building industry as raw material or as filler. The exhausted air was combusted in an incinerator and surplus energy was used for producing hot water by means of a heat exchanger.

EXAMPLE 4

Metallic Sludge from Plating System

The method of treating, handling, calcining and sintering of waste from electro-plating and mechanic-plating techniques, on-site of the waste production, was achieved according to the teachings of the present invention. Waste water from electro-plating and mechanic-plating techniques was treated by conventional neutralization, oxidation, reduction, precipitation, coagulation, sedimentation and filtration. To every one liter of waste water was added 2 to 3 grams of plastic clay (shale) powder to improve coagulation, flocculation, sedimentation and neutralization. After frame press filtration of sludge, a cake was produced with 55% H$_2$O, 45% solid (clay and heavy metals, Ca, Na). This cake was mixed with a material containing 97% clay plus 3% synthetic absorbent (acrylamide). The ratio was 4:1 (cake:plastic material). This mixture was then extrusion-shaped to form granules of 2 mm size which were conveyed to a conveyorized kiln for firing for 8 minutes at 1100° C. The leftover solid granules had a bulk density of 700 kg/m$^3$, a specific gravity of 1000 kg/m$^3$, a pH value of 6.9 and a moisture absorption of 3% and were inert and safe to use as raw material for paints and fire protecting systems.

EXAMPLE 5

31% Na$_2$Cr$_2$O$_7$

The method of treating, handling, drying, calcining and sintering of sodium dichromate effluent and waste solution on-site of the waste was achieved according to the teachings of the present invention. Sodium dichromate effluent is generated from chrome plating. 31% sodium dichromate waste solution was mixed with the plastic material (clay expanded glass or acrylamide copolymer and 3% of nepheline). The weight ratio was 1:1 of solution:plastic material. This mixture was then mixed in a mechanical fluidized bed with vacuum drying abilities to form granules which were dried for 25 minutes at 150° to 200° C. The dry granules were mixed a second time with waste solution 1:1 plus 3% absorbent. This mixture was then formed (in a mechanical fluidized bed with vacuum drying ability) into granules which were conveyed to a conveyorized kiln for firing at 1120° C. for 11 minutes. The resulting solid granules were inert and safe to use as raw material for (gunning) refractories, particularly fire protecting systems and as an additive for abrasives.

EXAMPLE 6

Zinc Sludge

The method of treating, handling, drying, calcining and sintering of zinc sludge was achieved according to the teachings of the present invention.

The composition of zinc sludge from metal industries had the following chemical composition:

| | |
|---|---|
| Water | 35.11% |
| Ash | 27.17% |
| Zinc | 320 g/kg wet material |
| Iron | 26.4 g/kg wet material |
| Chromium | 0.564 g/kg wet material |
| Lead | 9.78 g/kg wet material |

The above zinc sludge was mixed with 50% clay, 3% nepheline and 6.5% flint. The mixture was added into the reactor-mechanical fluidized bed, where with adjustable rotation speed and temperature a desirable dimension of granulates was achieved.

The granulates were then thermally treated with a graduated temperature from 20° C.-990° C. with a retention time of 9 minutes.

For thermal treatment a continual indirect heating system, a commercially available belt system, a tube system and a roll system was used.

During thermal preparation—calcination and sintration—a very stable spheric product was produced with low density spheres containing a multiplicity of independent closed air cells surrounded by a unique tough buter shell. The granulates had the following properties:

| | |
|---|---|
| Sphere size range: | 0.5-15 mm |
| Bulk density: | 400-500 kg/m$^3$ |
| Specific gravity: | 600-700 kg/m$^3$ |
| Surface characteristics: | Hydrophilic |
| Color: | brown, grey |
| Odor: | none |
| Thermal stability: | 1000° C. |

The above product may be used as controlled size aggregates for lightweight structural concrete, lightweight pre-fab concrete units, castable and/or gunning refractories, insulation blocks, gypsum wallboard and roofing systems.

Stability Tests

The treated product produced in the processes of Examples 1 to 6 above was subjected to the leachate extraction procedure according to Canadian Standard Regulation 309. Also subjected to the same stability test was a normal brick of the clay variety. In each case the extraction time was 24 hours. The quantity of 0.5 N acetic acid used by pH adjustment is indicated in the table below. At the end of the extraction period, enough distilled water was added to bring the total volume of liquid to 1000 ml. The pH of the leachate was adjusted to 5.0+0.2 after 15 minutes, 1, 3, 6 and 22 hours from the start.

TABLE 1

Sample Characteristics

| Sample | Moisture Content % | WT of (g) Sample used | Final Volume Leachate (ml) | Acetic Acid ml | pH Initial | pH Final |
|---|---|---|---|---|---|---|
| Example #1 | <0.1 | 36.90 | 738 | 7.8 | 5.9 | 4.9 |
| Example #2 | <0.1 | 15.89 | 318 | 0.5 | 5.0 | 4.8 |
| Example #2 | <0.1 | 36.74 | 735 | 16.1 | 4.7 | 4.9 |
| Example #3 | <0.1 | 14.70 | 294 | 1.2 | 5.3 | 4.8 |
| Example #4 | 0.44 | 50.22 | 1000 | 0.8 | 4.9 | 4.8 |
| Example #5 | <0.1 | 38.69 | 774 | 0.2 | 4.9 | 4.8 |
| Example #6 | <0.1 | 50.00 | 1000 | 0.5 | 6.4 | 5.1 |
| Example #6 | (client to supply data) | | | | | |
| Normal Brick | 0.28 | 50.14 | 1000 | 0.85 | 5.7 | 5.0 |

TABLE 2

Test Results

Example 1 sample
ICAP PLASMA SCAN ON LEACHATE MG/L (= ppm)

| | |
|---|---|
| Silicon (Si) | 16.0 |
| Aluminum (Al) | 1.9 |
| Iron (Fe) | 0.05 |
| Calcium (Ca) | 89 |
| Magnesium (Mg) | 38 |
| Sodium (Na) | 2 |
| Potassium (K) | <2 |
| Titanium (Ti) | <0.02 |
| Manganese (Mn) | 0.11 |
| Phosphorus (P) | <0.05 |
| Barium (Ba) | 0.09 |
| Chromium (Cr) | <0.02 |
| Zirconium (Zr) | <0.02 |
| Copper (Cu) | 0.29 |
| Nickel (Ni) | 0.05 |
| Lead (Pb) | <0.05 |
| Zinc (Zn) | 1.00 |
| Vanadium (V) | 0.04 |
| Strontium (Sr) | 0.11 |
| Cobalt (Co) | <0.01 |
| Molybdenum (Mo) | 0.07 |
| Silver (Ag) | <0.05 |
| Cadmium (Cd) | <0.005 |
| Beryllium (Be) | <0.01 |
| Boron (B) | <0.5 |

Example 2 sample
ICAP PLASMA SCAN ON LEACHATE MG/L (= ppm)

| | | C |
|---|---|---|
| Silicon (Si) | 1.7 | 1.7 |
| Aluminum (Al) | <0.01 | <0.01 |
| Iron (Fe) | <0.05 | <0.05 |
| Calcium (Ca) | 7.0 | 4.8 |
| Magnesium (Mg) | 6.4 | 4.6 |
| Sodium (Na) | 2.9 | 2.0 |
| Potassium (K) | 4.1 | 3.0 |
| Titanium (Ti) | <0.02 | <0.02 |
| Manganese (Mn) | 0.08 | <0.02 |
| Phosphorus (P) | <0.05 | <0.05 |
| Barium (Ba) | 0.03 | 0.02 |
| Chromium (Cr) | 0.07 | 0.08 |
| Zirconium (Zr) | <0.02 | <0.02 |
| Copper (Cu) | 0.05 | <0.02 |
| Nichel (Ni) | 0.03 | 0.04 |
| Lead (Pb) | <0.05 | <0.05 |
| Zinc (Zn) | 0.05 | <0.02 |
| Vanadium (V) | <0.02 | 0.04 |
| Strontium (Sr) | <0.02 | <0.02 |
| Cobalt (Co) | <0.01 | <0.01 |
| Molybdenum (Mo) | 0.08 | 0.12 |
| Silver (Ag) | <0.05 | <0.05 |
| Cadmium (Cd) | <0.005 | <0.005 |
| Beryllium (Be) | <0.01 | <0.01 |
| Boron (B) | <0.5 | <0.5 |

Example 3 sample
ICAP PLASMA SCAN ON LEACHATE MG/L (= ppm)

| | |
|---|---|
| Silicon (Si) | 6.2 |
| Aluminum (Al) | 0.7 |
| Iron (Fe) | <0.05 |
| Calcium (Ca) | 41 |
| Magnesium (Mg) | 9.3 |
| Sodium (Na) | 10 |
| Potassium (K) | 6.0 |
| Titanium (Ti) | <0.02 |
| Manganese (Mn) | 0.05 |
| Phosphorus (P) | <0.05 |
| Barium (Ba) | 0.20 |
| Chromium (Cr) | 0.17 |
| Zirconium (Zr) | <0.02 |
| Copper (Cu) | <0.02 |
| Nickel (Ni) | <0.02 |
| Lead (Pb) | 0.08 |
| Zinc (Zn) | 0.94 |
| Vanadium (V) | 0.37 |
| Strontium (Sr) | 0.10 |
| Cobalt (Co) | <0.01 |
| Molybdenum (Mo) | 1.4 |
| Silver (Ag) | <0.05 |
| Cadmium (Cd) | 0.015 |
| Beryllium (Be) | <0.01 |
| Boron (B) | <0.5 |

Example 4 sample
ICAP PLASMA SCAN ON LEACHATE MG/L (= ppm)

| | |
|---|---|
| Silicon (Si) | 3.8 |
| Aluminum (Al) | 1.1 |
| Iron (Fe) | <0.05 |
| Calcium (Ca) | 24 |
| Magnesium (Mg) | 1.8 |
| Sodium (Na) | 29 |
| Potassium (K) | <2 |
| Titanium (Ti) | <0.02 |
| Manganese (Mn) | <0.02 |
| Phosphorus (P) | <0.05 |
| Barium (Ba) | <0.01 |
| Chromium (Cr) | 0.04 |
| Zirconium (Zr) | <0.02 |
| Copper (Cu) | <0.02 |
| Nickel (Ni) | <0.02 |
| Lead (Pb) | <0.05 |
| Zinc (Zn) | 0.70 |
| Vanadium (V) | 0.03 |
| Strontium (Sr) | 0.06 |
| Cobalt (Co) | <0.01 |
| Molybdenum (Mo) | <0.02 |
| Silver (Ag) | <0.05 |
| Cadmium (Cd) | 0.032 |
| Beryllium (Be) | <0.01 |
| Boron (B) | <0.5 |

Example 5 sample
ICAP PLASMA SCAN ON LEACHATE MG/L (= ppm)

| | |
|---|---|
| Silicon (Si) | 1.5 |
| Aluminum (Al) | <0.1 |
| Iron (Fe) | <0.05 |
| Calcium (Ca) | 7.0 |
| Magnesium (Mg) | 0.36 |
| Sodium (Na) | 7 |
| Potassium (K) | 4 |
| Titanium (Ti) | <0.02 |
| Manganese (Mn) | <0.02 |
| Phosphorus (P) | <0.05 |
| Barium (Ba) | <0.01 |
| Chromium (Cr) | 0.16 |
| Zirconium (Zr) | <0.02 |

TABLE 2-continued
Test Results

| | |
|---|---|
| Copper (Cu) | <0.02 |
| Nickel (Ni) | <0.02 |
| Lead (Pb) | <0.05 |
| Zinc (Zn) | <0.02 |
| Vanadium (V) | 0.03 |
| Strontium (Sr) | <0.02 |
| Cobalt (Co) | <0.01 |
| Molybdenum (Mo) | <0.02 |
| Silver (Ag) | <0.05 |
| Cadmium (Cd) | <0.005 |
| Beryllium (Be) | <0.01 |
| Boron (B) | <0.5 |

Example 6 sample
ICAP PLASMA SCAN ON LEACHATE G1/1–G1/4

| | |
|---|---|
| Aluminum (Al) | <0.05 |
| Barium (Ba) | 0.02 |
| Beryllium (Be) | <0.005 |
| Boron (B) | <0.5 |
| Calcium (Ca) | 43 |
| Cadmium (Cd) | <0.005 |
| Chromium (Cr) | <0.02 |
| Cobalt (Co) | <0.01 |
| Copper (Cu) | <0.02 |
| Iron (Fe) | 0.55 |
| Lead (Pb) | <0.05 |
| Magnesium (Mg) | 3.5 |
| Manganese (Mn) | 0.02 |
| Molybdenum (Mo) | <0.02 |
| Nickel (Ni) | 0.06 |
| Phosphorus (P) | 0.3 |
| Potassium (K) | <1 |
| Silicon (Si) | <0.05 |
| Silver (Ag) | <0.05 |
| Sodium (Na) | 2 |
| Strontium (Sr) | 0.08 |
| Titanium (Ti) | <0.01 |
| Vanadium (V) | <0.02 |
| Zinc (Zn) | 0.3 |
| Zirconium (Zr) | <0.02 |

Normal commerical clay brick sample (produced in Ontario, Canada)
ICAP PLASMA SCAN ON LEACHATE MG/L (= ppm)

| | |
|---|---|
| Silicon (Si) | 2.7 |
| Aluminum (Al) | 0.2 |
| Iron (Fe) | <0.05 |
| Calcium (Ca) | 41 |
| Magnesium (Mg) | 3.4 |
| Sodium (Na) | 2 |
| Potassium (K) | 4 |
| Titanium (Ti) | <0.02 |
| Manganese (Mn) | 0.05 |
| Phosphorus (P) | <0.05 |
| Barium (Ba) | 0.10 |
| Chromium (Cr) | <0.02 |
| Zirconium (Zr) | <0.02 |
| Copper (Cu) | <0.02 |
| Nickel (Ni) | <0.02 |
| Lead (Pb) | <0.05 |
| Zinc (Zn) | 2.0 |
| Vanadium (V) | 0.22 |
| Strontium (Sr) | 0.09 |
| Cobalt (Co) | <0.01 |
| Molybdenum (Mo) | <0.02 |
| Silver (Ag) | <0.05 |
| Cadmium (Cd) | <0.005 |
| Beryllium (Be) | <0.01 |
| Boron (B) | <0.5 |

The above stability testing results show excellent stability of waste material treated using the present invention. For example, in the case of chromium, environmental protection legislation recently introduced in the Province of Ontario, Canada, requires chromium levels less than 0.5 ppm for the waste material not to be categorized as "waste". The above test results were surprising in that the chromium levels, which are typically of most concern, were low enough for the treated waste material not to be classified as waste under Province of Ontario regulations.

With the present invention inorganic, insoluble industrial raw materials can be economically produced from waste material which show a broad range of application. Due to the high stability of the material produced which is indicated by the low leachability of metals, especially of heavy metals, the raw material can safely be handled and used.

The embodiments of the invention in which a exclusive property or privilege is claimed are defined as follows:

1. A method for treating hazardous or toxic waste containing organic matter and metals, for producing an inorganic insoluble industrial raw material, comprising the steps of:

(a) mixing of said waste materials with a plastic material comprising oxides of silicon and aluminum and capable of forming nonleachable inorganic compounds with said metals to form a plastic mixture;

(b) preparing the plastic mixture into shaped articles with a large surface area;

(c) heat treating the shaped articles to remove the organic matters wherein drying and distillation occur at a temperature in the range of 60°–200° C. and pyrolysis occurs in an oxygen free environment at a temperature in the range of 400°–500° C.; and (d) bonding the inorganic matters to stable solid insoluble silicate complexes by calcining and sintering at a temperature in the range of 750°–1150° C.

2. Method according to claim 1, characterized in that before the step (a), the waste is subjected to a primary treatment comprising adding plastic material and neutralizing, precipitating, coagulating, sedimenting, filtering, dewatering, absorbing or flocculating the waste depending on its consistency to form a residue.

3. Method according to claim 1, characterized in that absorbents are added to the plastic material if this material does not exhibit a sufficient absorptivity by itself.

4. Method according to claim 3, characterized in that the amount of the plastic material ranges between 5 and 50 wt. % and the optional absorbents comprise a range of 0.1–10 wt. % with regard to the total mixture.

5. Method according to claim 2, characterized in that the amount of the plastic material lies in the range of 0.1–50 wt. % with regard to the waste material.

6. Method according to claim 1 or 2, characterized in that the plastic material comprises clay and/or alumosilicates with an average particle diameter of less than 5 μm.

7. Method according to claim 1 or 2, characterized in that the plastic material comprises one or more of alkaline metals, earth alkaline metals, boron or iron in addition to silicon and aluminum.

8. Method according to claim 1 or 2, characterized in that the plastic material includes one or more of the additive minerals albite, calcite, bauxite, borax, dolomite, felspar potash, flint, kaolinite, kyanite, magnesite, mica, montmorillonite, nepheline, orthoclase, sillimanite, spodumene, talc, vermiculite, wollastonite, aluminum oxide, silica oxide, lead bisilicate, dictometious earth, zeolyte and Na/Ca borosilicate glass.

9. Method according to claim 1 or 2, characterized in that the plastic material comprises 40–50 wt. % of threelayered clay minerals such as illite vermiculate, montmorillonite and chlorite.

10. Method according to claim 1, or 2, characterized in that the plastic material comprises at least one of shale and clay.

11. Method according to claim 1, or 2, characterized in that the plastic material has a high concentration of particles with an average particle size of less than 1 μm.

12. Method according to claim 3, characterized in that said absorbents are selected from the group consisting of Na-Ca borosilicate, perlite, expanded clay, expanded silicate and acrylamide copolymers.

13. Method according to claim 1, characterized in that in the step (b) the mixture is extruded, shaped and then divided into granules.

14. Method according to claim 1, characterized in that in the step (c) the articles are dried thereby distilling the organic solvents and/or water and next are pyrolyzed in an oxygen-free atmosphere whereby the resulting organic gases are condensed to organic solvents or oils.

15. A method for treating a variety of different types of hazardous or toxic waste comprising the steps of:
 a) mixing the waste with 5-50 wt. % powdered plastic reagent and 0.1-10 wt. % of an absorbent to form a solid mixture wherein said waste is physically and chemically bound to said plastic reagent;
 b) extruding the solid mixture to form granules having a large surface area;
 c) heating the granules to a temperature in the range of 60° to 200° C. for distillation of any water or organic solvents and to a temperature in the range of 400°-500° C. for pyrolysis of any hydrocarbons present in said waste in an oxygen-free environment;
 d) recovering organic solvents and gases; and
 e) calcining and sintering said granules within the temperature range of 750°-1150° C. for a period of time in the range of 10 minutes to 2 hours.

16. The method of claim 15 wherein:
said powdered plastic reagent has a high concentration of particles less than 1 μm in size and is comprised of at least one of plastic clay, $SiO_2$, $Al_2O_3$, $B_2O_3$, $Fe_2O_3$, FeO, $Na_2O$, CaO, $K_2O$ and MgO.

17. The method of claim 16 wherein:
prior to mixing the waste with 5-50% powdered plastic reagent and 0.1-10% of an absorbent to form a solid mixture said waste is subjected to a primary treatment comprising adding 0.1-50% powdered plastic reagent to physically and chemically bind said waste to said powdered plastic reagent and neutralizing, precipitating, coagulating, sedimenting, filtering, dewatering, absorbing or flocculating the waste to form a residue.

18. The method of claim 15, 16 or 17 wherein said method is performed in an automated, conveyorized closed system and during heating said granules the exhaust air is condensed to form a useable solvent or oil and any exhaust air produced is itself incinerated.

19. The method of claims 15, 16 or 17 wherein the absorbent is Na/Ca borosilicate expanded glass or perlite or expanded clay.

20. The method of claims 15, 16 or 17 wherein the waste content of the solid mixture is from 50 to 94.9% waste.

21. The method of claims 15, 16 or 17 wherein said granules are calcined and sintered for 10 minutes.

* * * * *